*(12)* United States Patent
McGrail et al.

(10) Patent No.: US 7,084,213 B2
(45) Date of Patent: Aug. 1, 2006

(54) COMPOSITIONS ADAPTED FOR CHAIN LINKING

(75) Inventors: Patrick Terence McGrail, Saltburn-by-the-Sea (GB); Jeffrey Thomas Carter, Middlesbrough (GB)

(73) Assignee: Cytec Technology Crop., Wilmington, DE (US)

( * ) Notice: Subject to any disclaimer, the term of this patent is extended or adjusted under 35 U.S.C. 154(b) by 0 days.

(21) Appl. No.: 10/362,502

(22) PCT Filed: Aug. 20, 2001

(86) PCT No.: PCT/GB01/03729

§ 371 (c)(1),
(2), (4) Date: May 22, 2003

(87) PCT Pub. No.: WO02/16456

PCT Pub. Date: Feb. 28, 2002

(65) Prior Publication Data

US 2004/0044141 A1    Mar. 4, 2004

(30) Foreign Application Priority Data

Aug. 22, 2000 (GB) ................................. 0020620.1

(51) Int. Cl.
*C08L 65/02* (2006.01)
*C08L 25/18* (2006.01)
*C08L 63/02* (2006.01)
*C08L 81/00* (2006.01)

(52) U.S. Cl. ....................... 525/392; 525/395; 525/396; 525/397; 525/535; 525/536; 528/290; 528/294; 528/295

(58) Field of Classification Search ................. 525/392, 525/395, 396, 397, 535, 536; 528/290, 294, 528/295
See application file for complete search history.

(56) References Cited

U.S. PATENT DOCUMENTS

| 4,156,771 | A | | 5/1979 | Loucks et al. ............... 528/213 |
| 4,972,031 | A | * | 11/1990 | Choate et al. ............... 525/535 |
| 5,068,286 | A | * | 11/1991 | Campbell et al. ............. 525/66 |
| 5,266,610 | A | * | 11/1993 | Malhotra et al. ........... 523/201 |
| 5,464,891 | A | * | 11/1995 | Nagaoka et al. ............. 524/230 |
| 5,741,846 | A | * | 4/1998 | Lohmeijer et al. .......... 524/538 |
| 5,876,851 | A | * | 3/1999 | Matsumura et al. ........ 428/412 |

FOREIGN PATENT DOCUMENTS

| WO | WO 8607368 | 12/1986 |
| WO | WO 94 02537 | 2/1994 |

* cited by examiner

*Primary Examiner*—Jeffrey B. Robertson
(74) *Attorney, Agent, or Firm*—Robert R. Neller; Fran Wasserman

(57) ABSTRACT

A polymer composition comprising chains of at least one aromatic polymer or a mixture thereof together with at least one chain linking component wherein the at least one aromatic polymer comprises polymer chains of number average molecular weight (Mn) in a first range and characterised by a polymer flow temperature, and having at least one reactive end group, and wherein the at least one chain linking component comprises at least two linking sites, characterised in that a plurality of the polymer chain end groups are adapted to react with the linking sites at chain linking temperature in excess of the polymer flow temperature to form linked polymer chains of number average molecular weight (Mn) in a second range which is in excess of the first range, substantially thermoplastic in nature; process for the preparation thereof; prepreg, composite or shaped product obtained therewith and the use thereof.

4 Claims, 10 Drawing Sheets

EPIKOTE-828

PEES
324.35794

PES
464.51952

TAN DELTA AS A FUNCTION OF TEMPERATURE
FOR KM RESINS OF VARYING MOL WEIGHT

COMPOSITIONS ADAPTED FOR CHAIN LINKING

The present invention relates to polymer compositions, prepregs, laminar composites and shaped articles adapted for chain linking in manner to increase the number average molecular weight thereof, a process for the preparation and shaping thereof, a process for the chain linking thereof. Specifically the present invention relates to polyaromatic compositions, prepregs, laminar composites and shaped articles.

The use of curable compositions such as epoxy, cyanate, phenolic and like resins, both reinforced and unreinforced, has been known for a long time in a wide variety of structural commercial and military applications. In constructing sports devices, building materials, aeronautical, land and nautical vehicles, light weight carbon-based tough materials have been found to give enhanced performance. Moreover these compositions are found to have uses as high temperature curing adhesives.

More recently, classes of polyaromatic compositions comprising polyaryl thermoplastic components containing ether- and/or thioether-linked repeating units in the form of polyether aromatics and polyetherether aromatics are known for the manufacture of engineering polymers and composites having unique properties in terms of strength, fracture toughness, modulus and high temperature stability and resistance. In particular the semi-crystalline polyaryl components have excellent solvent resistance properties.

These polymer compositions are typically prepared at temperatures in excess of their crystalline melt temperature, e.g. in the range of up to 365° C., formed with autoclaving into prepregs, composites or shaped articles and subsequently processed at elevated temperature and/or with use of a curing agent. There is a trade off between the advantageous solvent resistance of semi-crystalline compositions and their high processing temperature. It would therefore be advantageous to be able to provide semi-crystalline compositions which may be processed at lower temperatures, whereby their use could become more accessible for manufacture of articles.

The quality of prepregs, composites or shaped articles obtained with these compositions is dependent on a number of factors, not least the rheology thereof, in terms of ease and uniformity of impregnation, molding or shaping, together with ability to be retained in impregnated, molded or shaped form without distortion prior to and during processing of impregnated, molded or shaped articles.

Typically there is a trade off between providing compositions with sufficiently low viscosity to enable complete and accurate impregnation, molding or shaping thereof but with acceptable mechanical properties in processed form, against an excessively high viscosity at which impregnation, molding and shaping performance deteriorates excessively.

Attempts to improve processing and mechanical performance of such compositions have focussed on modification of the nature of components, for example, including a blend of thermoplast and thermoset components to optimise the processed mechanical properties or modification of the method for impregnating, molding or shaping, for example, in solution of a suitable solvent which may subsequently be evaporated prior to processing. These attempts, however introduce further problems in terms of morphology control, solvent resistance and void formation for example.

In "Polyaromatics", P. T. McGrail, Polymer International 41 (1996) 103–121, polyaromatics and their synthesis and properties are reviewed. In particular the above problems in terms of prepregging, for example from solution, and properties of processed prepregs are discussed with reference to block copolymers comprising blocks of distinct polymer types linked via reactive pendant groups and functionalised polyaromatics having reactive groups adapted for cross-linking are discussed. This comprehensive review of currently available techniques discloses the compromises which must be made and problems which are encountered in the manufacture of engineering polymers from fluid compositions.

We have now surprisingly found however that polymer compositions may be provided which overcome the problems described above in admirable manner, having excellent Theological properties for prepregging, molding and shaping into articles, combined with excellent mechanical and solvent resistance properties as engineering polymers.

Accordingly a first object of the present invention is to provide polyaromatic compositions for making molded, impregnated or otherwise shaped articles for which mechanical properties of processed molded, impregnated or otherwise shaped articles may be controlled independently of constraints imposed by rheology required for effective injection molding, impregnation or shaping to form articles.

A second object of the present invention is to provide polyaromatic compositions prepared in a calculated molecular weight range of polymer which may be achieved independently of constraints imposed by the preparation process, such as solubility constraints and the like.

A third object of the present invention is to provide polyaromatic compositions with a desired level of uniform mobility to provide a desired increase in number average molecular weight on further reaction thereof.

A fourth object of the present invention is to provide high quality injection molded, impregnated or otherwise shaped articles of essentially thermoplastic polymers obtained with improved properties of finished articles and having improved solvent resistance properties without the commonly associated high processing temperatures required for molding, impregnation or otherwise shaping thereof.

Figure 1:
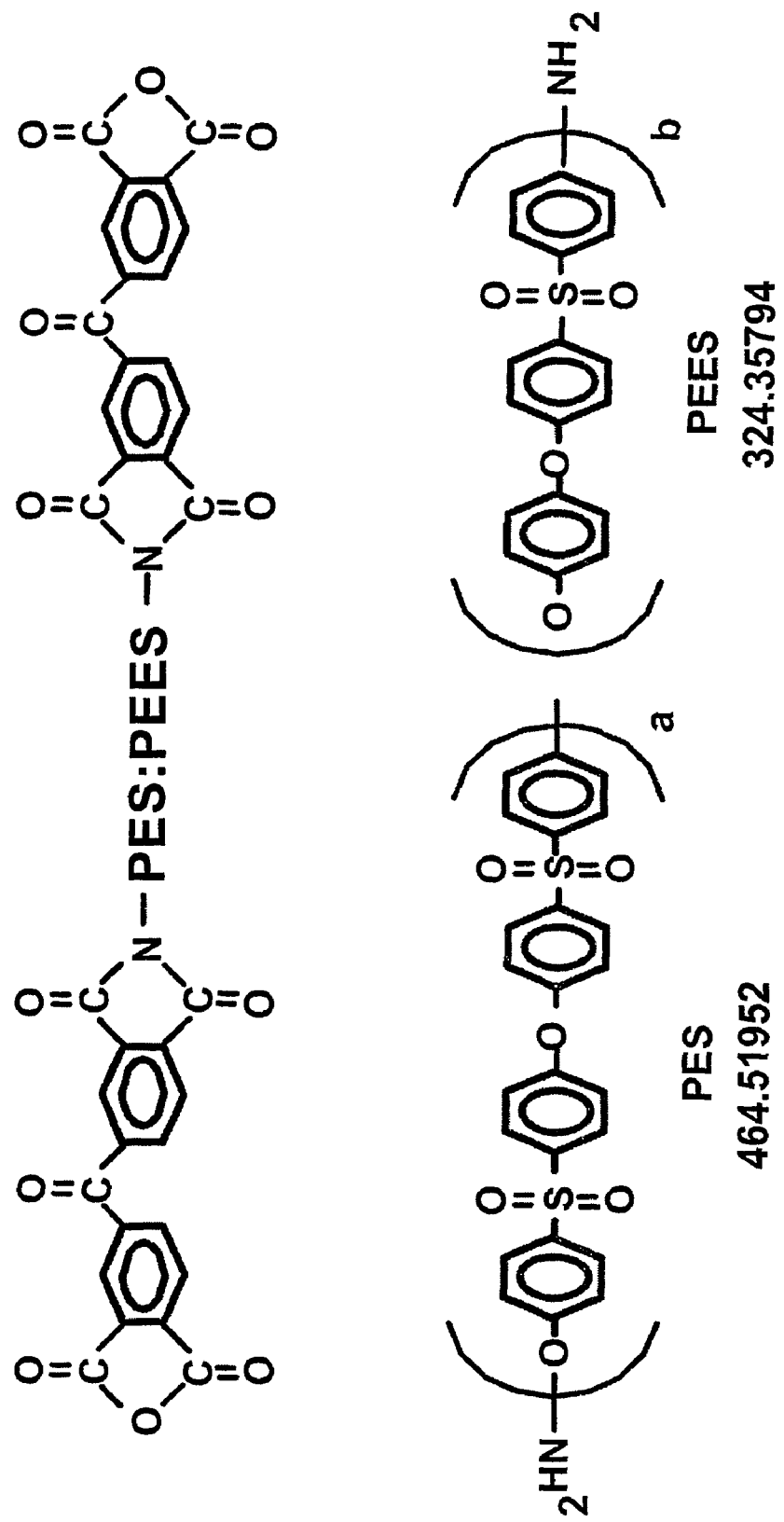
FIG. 1 depicts the chemical structure of 40:60 PES:PEES copolymer as synthesized in Example 2 to create an amine terminated polymer.

In its broadest aspect there is provided according to the present invention aromatic polymer compositions having rheology adapted for impregnation, is molding or otherwise shaping and being adapted for subsequent reactive chain linking thereof to provide polymer compositions of increased molecular weight which are substantially thermoplastic in nature.

Specifically there is provided according to the present invention a polymer composition comprising chains of at least one aromatic polymer or a mixture thereof together with at least one chain linking component wherein the at least one aromatic polymer comprises polymer chains of number average molecular weight (Mn) in a first range and characterised by a polymer flow temperature, and having at least one reactive end group, and wherein the at least one chain linking component comprises at least two linking sites, characterised in that a plurality of the polymer chain end groups are adapted to react with the linking sites at chain linking temperature in excess of the polymer flow temperature to form linked polymer chains of number average molecular weight (Mn) in a second range which is in excess of the first range, substantially thermoplastic in nature.

The polymer composition as hereinbefore defined may be adapted for prereaction to form a precursor composition comprising an amount of at least one aromatic polymer as hereinbefore defined, together with an amount thereof, which has been prereacted at chain terminating conditions with the at least one chain linking component as hereinbefore defined to form polymer chains of Mn in the first range, characterised by a polymer flow temperature and having its reactive end groups terminated with linking component, characterised in that a plurality of the polymer chain reactive end groups are adapted to react with the linking sites of linking component terminated polymer chains at chain linking temperature in excess of the polymer flow temperature to form linked polymer chains of number average molecular weight (Mn) in a second range which is in excess of the first range.

Flow temperature is defined as the temperature at which the polymer attains a suitably molten or fluid state to enable a degree of polymer chain mobility to orient or align itself for reaction.

Chain linking temperature is defined as the temperature at which the polymer chain ends reaction is initiated. Preferably the chain linking temperature is higher than a product processing temperature, to remove solvent and improve wet out of the prepreg which leads to better quality prepreg with easier handling characteristics.

Chain terminating conditions may be selected such that self reaction is avoided, ie whereby the chain termination does not develop into a chain linking reaction.

The composition is adapted for shaping with reduced physical void formation as a result of the greater and more uniform mobility of the composition having Mn in a first range. This is particularly advantageous and enables high through put laminate production without temperature ramping or degassing.

The difference in first and second Mn ranges is defined as the increase at which a desired extent of reaction is achieved by means of choice of stoichiometry, reaction time or temperature at which mobility decreases as a result of reaction below that for polymer chains to align themselves for further reaction. It will be appreciated therefore that the second Mn range may be controlled by selection of stoichiometry or reaction time or of chain linking temperature with respect to the flow temperature and with respect to any postcure temperature applied.

The number average molecular weight of the polyaromatic in the second range is suitably in the range 9000 to 60000. A useful sub-range is for example 11000 to 25000, and in the first range is suitably in the range of 2000 to 11000, especially in the range of 3000 to 9000.

The composition may comprise an additional solvent for the polymer chains whereby a reduced flow temperature may be attained. Preferably the composition comprises substantially no solvent and is adapted for flow and chain linking in the absence of any solvent or effective amount thereof. It is a particular advantage that compositions comprising no solvent are adapted to retain the polymer chain morphology in the chain linked form.

It is a particular advantage of the invention that the compositions are adapted for forming articles at low temperature due to their flowable rheology in unreacted form giving excellent moulding, impregnation wet out or shaping complexity (with injection moulding), and in reacted form having number average molecular weight in a second range as hereinbefore defined they are characterised by mechanical and thermal properties corresponding to known compositions comprising polymer chains having number average molecular weight in the second range as hereinbefore defined. This allows the use of cheaper bagging, moulding, tie-down or other ancillary materials.

Preferably compositions comprising two or more aromatic polymers comprise a first and second polymers having the same polymer backbone but different end groups, both being amorphous, or comprise a first aromatic polymer having a lower flow temperature than a second similar aromatic polymer, both being amorphous the second polymer being rendered in flowable form in the presence of the first polymer in fluid form, thereby providing a processing aid, or comprise an amorphous polymer and a semi crystalline polymer having a characteristic melting point, the semi crystalline polymer being rendered flowable by solvent effect of the first polymer, and is not truly molten at a temperature below that at which it is normally processable as determined by its characteristic melting point.

More preferably a second aromatic polymer is (semi) crystalline and is rendered in flowable form by solvating action of a first amorphous aromatic polymer. Accordingly the first aromatic polymer may act as a cosolvent, diluent, dispersant, carrier or the like for the second aromatic polymer. This is of particular advantage in enabling the preparation of multiblock compositions having lowered processing temperatures whilst nevertheless retaining excellent product properties such as solvent resistance. It is of significance that the product exhibits (semi)crystalline morphology, which is responsible for excellent solvent resistance of some product polymers of the invention.

Reactive end groups and chain linking sites as hereinbefore defined are suitably any functional groups adapted to be inert at low temperature and to mutually react at elevated temperature in manner to link the polymer chains and linking component and effect chain linking. End groups and chain linking sites may be the same, in the case of self reacting functionalities, or may be different in the case of different reacting functionalities.

Reactive end groups (Y) and chain linking sites (Z) are selected from any functional groups providing active hydrogen and any polar functional group adapted to react at elevated temperature in the presence of an electrophile, preferably selected from active H, OH, NH$_2$, NHR or SH wherein R is a hydrocarbon group containing up to 8 carbon atoms, epoxy, (meth)acrylate, iso)cyanate, isocyanate ester, acetylene or ethylene as in vinyl or allyl, maleimide, anhydride, carboxylic acid, oxazoline and monomers containing unsaturation; preferably reactive end groups Y are selected from active H, OH, NH$_2$, NHR or SH and chain linking sites Z are selected from epoxy, (meth)acrylate, (iso)cyanate, isocyanate ester, acetylene or ethylene as in vinyl or allyl, maleimide, anhydride, carboxylic acid, oxazoline and monomers containing unsaturation.

Preferably a chain linking component is of the formula B(Z)n(Z')n' wherein B is a polymer chain or is a carbon atom backbone having from 1 to 10 carbon atoms, more preferably is an oligomer or polymer or is an aliphatic, alicyclic or aromatic hydrocarbon optionally substituted and/or including heteroatoms N,S,O or is a single bond or nucleus such as C, O, S, N or Transition metal; Z and Z' are each independently selected from functional groups as hereinbefore defined for Z;

n and n' are each zero or a whole number integer selected from 1 to 6; and the sum of n and n' is at least 2, preferably 2 to 10,000, more preferably 2 to 10 or 10 to 500 or 500 to 10000.

More preferably a chain linking component is selected from the formula B(Z)n wherein B and Z are as hereinbefore defined and n is selected from 2 to 6.

Accordingly it will be apparent that self reaction between methacrylate ended polymer and chain linking component or between maleimide ended polymer and chain linking component or between oxazoline ended polymer and chain linking component for example is possible and within the scope of the present invention.

It is possible that a small amount of polymer chains and chain linking component have mixed reactive end groups and chain linking sites, ie one of each of the above defined groups, whereby in a relatively mobile early stage of the chain linking reaction, the end groups and sites are able to seek each other out by alignment of the polymer chains and chain linking components. Preferably however reactive end groups are of one type and chain linking components are of a second type.

A polymer chain comprises at least one reactive end group whereby at least one end may be linked to other polymer chains. Preferably a linear or branched polymer chain having at least two ends comprises at least two reactive end groups. Reactive end groups may be the same or different and are preferably the same, whereby a polymer chain is termed a diol, polyol, diamine, polyamine, dithiol or polythiol or the like.

A chain linking component comprises at least two linking sites whereby at least two polymer chains may be linked together. Preferably a chain linear-linking component comprises two linking sites, and a chain network-linking component such as a "star" architecture linking component comprises at least three linking sites. Linking sites may be the same or different and are preferably the same, whereby a linking component is termed a diepoxy, polyepoxy, di(meth)acrylate, poly(meth)acrylate, di(iso)cyanate, poly(iso)cyanate, diacetylene, polyacetylene, dianhydride, polyanhydride, dioxazoline, polyoxazoline or the like.

A chain linking component is therefore selected from any component which is capable of supporting multiple functionality in close proximity, in manner that the multiple functional groups are capable of reaction. The component comprises a carbon atom backbone or polymer chain linking the linking sites as hereinbefore defined, and linking site may be supported as pendant and/or end groups of a linear, cyclic or combined linear-cyclic backbone.

In a further aspect of the invention there is therefore provided a novel chain linking component as hereinbefore defined. Preferred linking components are selected from the structures:

EPIKOTE 828® brand synthetic resin sold by Shell Chemical Corporation of Houston, Texas

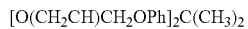

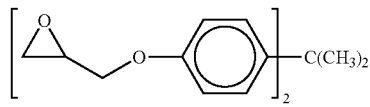

Benzophenone tetra carboxylic acid dianhydride (BTDA)

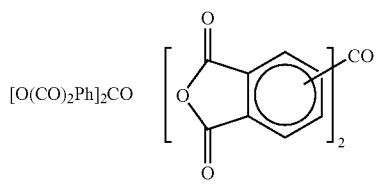

Maleic anhydride having units

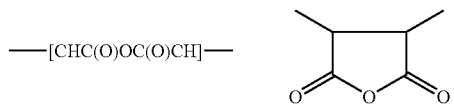

In one preferred embodiment the reactive end group is hydroxy and corresponds to a linking site functionality which is epoxy, whereby reaction thereof produces a β hydroxy ether linkage in polymers of increased number average molecular weight having either hydroxy or epoxy end groups as desired. Alternatively, the reactive end group is NH$_2$ and the linking site functionality is anhydride, whereby reaction thereof produces an imide linkage in polymers of increased number average molecular weight having NH$_2$ or anhydride end groups. Alternatively the reactive end group is NH$_2$ and the linking site functionality is maleimide. Mixtures of the above may be employed to produce a mixed architecture including a plurality of reactive end group-linking site combinations.

Aromatic polymer chains have at least one reactive end group as hereinbefore defined, and linking components have at least two linking sites. The reactive end groups and linking sites may be present, calculated by the amount of polymer chain and linking component, in the required stoichiometric amounts to enable up to 100% linking of polymer chains in multiples of two (binary linking), three (tertiary linking), four (ternary linking), for example in a "star" architecture, and combinations thereof. Preferably amounts are calculated to give 80–100% linking, more preferably 90–100% linking, most preferably 95–100% linking, for example substantially 100% linking, or may be present with one or other in excess.

An amount of a single ended or end capping component or polymer chain may be present to end cap the linked chains, and may be the same or different from the polymer chain or linking component.

Compositions comprising more than one aromatic may comprise aromatics each having a different type of end groups or may comprise all aromatics having the same type(s) of end groups as hereinbefore defined. One or more chain linking components may be provided with the same or different linking site functionality.

Preferably each polymer chain present in the composition has reactive end groups of the same type whereby reaction can take place without any specific orientation of polymer chains with respect to chain linking component. It is a particular advantage that polymer chains may be to an extent self-orientating in that reactive end groups of the polymer chains have an affinity for linking sites of the chain linking component.

Block copolymers may be generated by chain linking different polymer chain types, having the same or different reactive end groups, adapted to alternate in desired manner.

An amount of additional intra or inter chain functionality may be provided in the form of functional groups along the chain length. Accordingly the chain linking component may be selected to provide such functionality, for example as solvent resistance (F), cross-linking grafting sites (unsaturated groups), Tg enhancing or compatibilising agents eg a microstructure compatible and reactive with another polymer.

It is a particular advantage that the compositions of the invention may be provided in distinct forms having characteristic number average molecular weight as hereinbefore defined.

Preferably the at least one polyaromatic comprises same or different repeating units of the formula

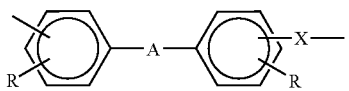

wherein A is selected from $SO_2$, a direct link, oxygen, sulphur, —CO— and a divalent hydrocarbon radical;

X is a divalent group;

R is any one or more substituents of the aromatic rings, each independently selected from hydrogen, $C_{1-8}$ branched or straight chain aliphatic saturated or unsaturated aliphatic groups or moieties optionally comprising one or more heteroatoms selected from O, S, N, or halo for example Cl or F; and groups providing active hydrogen especially OH, $NH_2$, NHR— or —SH, where R— is a hydrocarbon group containing up to eight carbon atoms, or providing other cross-linking activity especially epoxy, (meth) acrylate, cyanate, isocyanate, acetylene or ethylene, as in vinyl, allyl or maleimide, anhydride, oxazoline and monomers containing unsaturation; and wherein said at least one polyaromatic comprises reactive pendant and/or end groups preferably selected from reactive heteroatoms, heteroatom containing or cross-linking groups as defined for R.

Suitably the at least one polyaromatic comprises ether-linked and/or thioether-linked repeating units, the units being selected from the group consisting of

and optionally additionally

wherein A is $SO_2$, or CO, Ph is phenylene, n=1 to 2, a=1 to 4 and when a exceeds 1, said phenylenes are linked linearly through a single chemical bond or a divalent group other than —A— or are fused together directly or via a cyclic moiety such as a cycloalkyl group, a (hetero) aromatic group, or cyclic ketone, amide, amine, or imine, said at least one polyarylsulphone having reactive pendant and/or end groups.

More preferably the at least one polyaromatic comprises at least one polyaryl sulphone comprising ether-linked repeating units, optionally additionally comprising thioether-linked repeating units, the units being selected from the group consisting of

and optionally additionally

wherein Ph is phenylene, n=1 to 2, a=1 to 3 and when a exceeds 1, said phenylenes are linked linearly through a single chemical bond or a divalent group other than —$SO_2$— or are fused together, provided that the repeating unit —$(PhSO_2Ph)_n$— is always present in said at least one polyarylsulphone in such a proportion that on average at least two of said units —$(PhSO_2Ph)_n$— are in sequence in each polymer chain present, said at least one polyarylsulphone having reactive pendant and/or end groups.

Preferably the polyaromatic comprises polyether sulphone, more preferably a combination of polyether sulphone and polyether ether sulphone linked repeating units, in which the phenylene group is meta- or para- and is preferably para and wherein the phenylenes are linked linearly through a single chemical bond or a divalent group other than sulphone, or are fused together. By "fractional" reference is made to the average value for a given polymer chain containing units having various values of n or a.

Additionally, as also discussed, in said at least one polyarylsulphone, the relative proportions of the said repeating units is such that on average at least two units $(PhSO_2Ph)_n$ are in immediate mutual succession in each polymer chain present and is preferably in the range 1:99 to 99:1, especially 10:90 to 90:10, respectively. Typically the ratio is in the range 25–50 or more preferably in the range 75–50 $(Ph)_a$, balance (Ph $SO_2Ph)_n$. In preferred polyarylsulphones the units are:

I X Ph $SO_2$ Ph X Ph $SO_2$ Ph ("PES") and
II X $(Ph)_a$ X Ph $SO_2$ Ph ("PEES")
where X is O or S and may differ from unit to unit; the ratio is I to II (respectively) preferably between 10:90 and 80:20 especially between 10:90 and 55:45, more especially between 25:75 and 50:50; or the ratio is between 20:80 and 70:30, more preferably between 30:70 and 70:30, most preferably between 35:65 and 65:35.

The flow temperature of polyetherethersulphone is generally less than that of a corresponding Mn polyethersulphone, but both possess similar mechanical properties. Accordingly the ratio may be determined, by determining a and n above.

In copending UK patent application no. 9803714.6 is disclosed a process for the obtaining such compositions from their monomer precursors in manner to isolate the monomer precursors in selected molecular weight as desired.

The preferred relative proportions of the repeating units of the polyarylsulphone may be expressed in terms of the weight percent $SO_2$ content, defined as 100 times (weight of $SO_2$)/(weight of average repeat unit). The preferred $SO_2$ content is at least 22, preferably 23 to 25%. When a=1 this corresponds to PES/PEES ratio of at least 20:80, preferably in the range 35:65 to 65:35.

The above proportions refer only to the units mentioned. In addition to such units the polyarylsulphone may contain up to 50 especially up to 25% molar of other repeating units: the preferred $SO_2$ content ranges (if used) then apply to the whole polymer. Such units may be for example of the formula

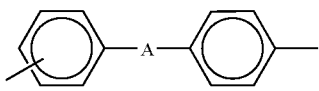

as hereinbefore defined, in which A is a direct link, oxygen, sulphur, —CO— or a divalent hydrocarbon radical. When the polyarylsulphone is the product of nucleophilic synthesis, its units may have been derived for example from one or more bisphenols and/or corresponding bisthiols or phenol-thiols selected from hydroquinone, 4,4'-dihydroxybiphenyl, resorcinol, dihydroxynaphthalene (2,6 and other isomers), 4,4'-dihydroxybenzophenone, 2,2'-di(4-hydroxyphenyl)propane and -methane.

If a bis-thiol is used, it may be formed in situ, that is, a dihalide as described for example below may be reacted with an alkali sulphide or polysulphide or thiosulphate.

Other examples of such additional units are of the formula

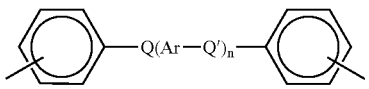

in which Q and Q', which may be the same or different, are CO or $SO_2$; Ar is a divalent aromatic radical; and n is 0, 1, 2, or 3, provided that n is not zero where Q is $SO_2$. Ar is preferably at least one divalent aromatic radical selected from phenylene, biphenylene or terphenylene. Particular units have the formula

where m is 1, 2 or 3. When the polymer is the product of nucleophilic synthesis, such units may have been derived from one or more dihalides, for example selected from 4,4'-dihalobenzophenone, 4,4'bis(4-chlorophenylsulphonyl)biphenyl, 1,4,bis(4-halobenzoyl)benzene and 4,4'-bis(4-halobenzoyl)biphenyl.

They may of course have been derived partly from the corresponding bisphenols.

The polyaromatic may be the product of nucleophilic synthesis from halophenols and/or halothiophenols. In any nucleophilic synthesis the halogen if chlorine or bromine may be activated by the presence of a copper catalyst.

Such activation is often unnecessary if the halogen is activated by an electron withdrawing group. In any event fluoride is usually more active than chloride. Any nucleophilic synthesis of the polyaromatic is carried out preferably in the presence of one or more alkali metal salts, such as KOH, NaOH or $K_2CO_3$ in up to 10% molar excess over the stoichiometric.

As previously mentioned, said at least one polyaromatic contains reactive end groups. Reactive end groups may be obtained during the preparation from monomers or by conversion from polymers having non-reactive end groups or having a different type of end groups.

The polyaromatic of the invention may be further combined with additional polymers in reactive or non reactive manner, for example polyimides, polyolefins (polypropylene PP, polyphenyleneoxide PPO, polyvinylchloride PVC), acrylics, aromatic polyesters (polyethyl teraphalate PET) or thermoplast or thermoset polymers as hereinbefore described. For example the polyaromatic may be reacted with polyimide, semicrystalline PET/PEK, PEG or siloxane for enhanced Tg, solvent resistance and the like.

Thermoset polymers may be selected from the group consisting of an epoxy resin, an addition-polymerisation resin, especially a bis-maleimide resin, a formaldehyde condensate resin, especially a formaldehyde-phenol resin, a cyanate resin, an isocyanate resin, a phenolic resin and mixtures of two or more thereof, and is preferably an epoxy resin derived from the mono or polyglycidyl derivative of one or more of the group of compounds consisting of aromatic diamines, aromatic monoprimary amines, aminophenols, polyhydric phenols, polyhydric alcohols, polycarboxylic acids and the like, or a mixture thereof, a cyanate ester resin or a phenolic resin. Examples of addition-polymerisation resins are acrylics, vinyls, bis-maleimides, and unsaturated polyesters. Examples of formaldehyde condensate resins are urea, melamine and phenols.

Preferably the thermoset polymer comprises at least one epoxy, cyanate ester or phenolic resin precursor, which is liquid at ambient temperature for example as disclosed in EP-A-0 311 349, EP-A-0 365 168, EPA 91310167.1 or in PCT/GB95/01303.

An epoxy resin may be selected from N,N,N'N'-tetraglycidyl diamino diphenylmethane (eg "MY 9663", "MY 720" or "MY 721" sold by Ciba-Geigy) viscosity 10–20 Pa s at 50° C.; (MY 721 is a lower viscosity version of MY720 and is designed for higher use temperatures); N,N,N',N'-tetraglycidyl-bis(4-aminophenyl)-1,4-diiso- propylbenzene (eg Epon 1071 sold by Shell Chemical Co) viscosity 18–22 Poise at 110° C.; N,N,N',N'-tetraglycidyl-bis(4-amino-3,5-dimethylphenyl)- 1,4-diisopropylbenzene, (eg Epon 1072 sold by Shell Chemical Co) viscosity 30–40 Poise at 110° C.; triglycidyl ethers of p-aminophenol (eg "MY 0510" sold by Ciba-Geigy), viscosity 0.55–0.85 Pa s at 25° C.; preferably of viscosity 8–20 Pa at 25° C.; preferably this constitutes at least 25% of the epoxy components used; diglycidyl ethers of bisphenol A based materials such as 2,2-bis(4,4'-dihydroxy phenyl) propane (eg "DE R 661" sold by Dow, or EPIKOTE 828 brand synthetic resin sold by Shell Chemical Corporation of Houston, Texas), and Novolak resins preferably of viscosity 8–20 Pa s at 25° C.; glycidyl ethers of phenol Novolak resins (eg "DEN 431" or "DEN 438" sold by Dow), varieties in the low viscosity class of which are preferred in making compositions according to the invention; digylcidyl 1,2-phthalate, eg GLY CEL A-100; diglycidyl derivative of dihydroxy diphenyl methane (Bisphenol F) (eg "PY 306" sold by Ciba Geigy) which is in the low viscosity class. Other epoxy resin precursors include cycloaliphatics such as 3',4'-epoxycyclohexyl-3,-4-epoxy-cyclohexane carboxylate (eg "CY 179" sold by Ciba Geigy) and those in the "Bakelite" range of Union Carbide Corporation.

A cyanate ester resin may be selected from one or more compounds of the general formula $NCOAr(Y_xAr_m)_qOCN$ and oligomers and/or polycyanate esters and combinations thereof wherein Ar is a single or fused aromatic or substituted aromatics and combinations thereof and therebetween nucleus linked in the ortho, meta and/or para position and $x=0$ up to 2 and m and $q=0$ to 5 independently. The Y is a linking unit selected from the group consisting of oxygen, carbonyl, sulphur, sulphur oxides, chemical bond, aromatic linked in ortho, meta and/or para positions and $CR_1R_2$ wherein $R_1$ and $R_2$ are hydrogen, halogenated alkanes, such as the fluorinated alkanes and/or substituted aromatics and/or hydrocarbon units wherein said hydrocarbon units are singularly or multiply linked and consist of up to 20 carbon atoms for each $R_1$ and/or $R_2$ and $P(R_3R_4R'_4R_5)$ wherein $R_3$ is alkyl, aryl, alkoxy or hydroxy, $R'_4$ may be equal to $R_4$ and is a singly linked oxygen or chemical bond, $R_5$ is doubly linked oxygen or chemical bond and $Si(R_3R_4R'_4R_6)$ wherein $R_3$ and $R_4$, $R'_4$ are defined as in $P(R_3R_4R'_4R_5)$ above and $R_5$ is defined similar to $R_3$ above. Optionally, the thermoset can consist essentially of cyanate esters of phenol/formaldehyde derived Novolaks or dicyclopentadiene derivatives thereof, an example of which is XU71787 sold by the Dow Chemical Company.

A phenolic resin may be selected from any aldehyde condensate resins derived from aldehydes such as methanal, ethanal, benzaldehyde or furfuraldehyde and phenols such as phenol, cresols, dihydric phenols, chlorphenols and $C_{1-9}$ alkyl phenols, such as phenol, 3- and 4-cresol (1-methyl, 3- and 4-hydroxy benzene), catechol (2-hydroxy phenol), resorcinol (1,3-dihydroxy benzene) and quinot (1,4-dihydroxy benzene). Preferably phenolic resins comprise cresol and novolak phenols.

The thermoset polymer is suitably the product of at least partly curing a resin precursor using a curing agent and optionally a catalyst.

The weight proportion of thermoplast component in the composition is typically in the range 5 to 100%, preferably 5 to 90%, especially 5 to 50, for example 5 to 40%.

The thermoset and polyarylaromatic are suitably reacted in the presence of a curing agent to provide a resin composition. The curing agent is suitably selected from any known curing agents, for example as disclosed in EP-A-0 311 349, EPA 91310167.1, EP-A-0 365 168 or in PCT/GB95/01303, which are incorporated herein by reference, such as an amino compound having a molecular weight up to 500 per amino group, for example an aromatic amine or a guanidine derivative. Particular examples are 3,3'- and 4-,4'-diaminodiphenylsulphone, (available as "DDS" from commercial sources), methylenedianiline, bis(4-amino-3,5-dimethylphenyl)-1,4-diisopropylbenzene (available as EPON 1062 from Shell Chemical Co); bis(4-aminophenyl)-1,4-diisopropylbenzene (available as EPON 1061 from Shell Chemical Co); 4-chlorophenyl-N,N-dimethyl-urea, eg Monuron; 3,4-dichlorophenyl-N,N-dimethyl-urea, eg Diuron and dicyanodiamide (available as "Amicure CG 1200 " from Pacific Anchor Chemical). Other standard epoxy curing agents such as aliphatic diamines, amides, carboxylic acid anhydrides, carboxylic acids and phenols can be used if desired. If a novolak phenolic resin is used as the main thermoset component a formaldehyde generator such as hexamethylenetetraamine (HMT) is typically used as a curing agent.

Conventionally, and as described in EP-A-0 311 349 or in PCT/GB95/01303, a catalyst for the epoxy resin component/curing agent reaction may also be used, typically a Lewis acid or a base.

In a further aspect there is provided according to the present invention a process for the preparation of a polymer composition comprising at least one aromatic polymer or a mixture thereof, the process comprising:
 i) providing polyaromatic polymer chains having Mn in a first range as hereinbefore defined and characterised by a polymer flow temperature, wherein the at least one polyaromatic polymer chains have at least one reactive end group, and
 ii) providing at least one chain linking component having at least two linking sites as hereinbefore defined, and
 iii) admixing at a first temperature which is less than the chain linking temperature at which the reactive end group and linking sites are adapted to react as hereinbefore defined.

The admixing may be carried out at or below the composition flow temperature employed for shaping the composition, and shaping may be carried out simultaneously or subsequently.

The chain linking component may be prepared by interconversion from the corresponding component to introduce linking sites, or may be prepared by a dedicated synthesis.

In a further aspect of the invention there is therefore provided a process for the preparation of a chain linking component as hereinbefore defined by interconversion from the corresponding component to introduce a plurality of linking sites.

The polymers of the composition may be prepared from polymer precursors comprising monomers in the presence of a reactive component adapted to provide the desired reactive end group, or may be prepared by interconversion from the polymer having a different type of end group by reaction with a component adapted to provide the desired reactive end groups. Processes for the preparation of polyaromatics are disclosed in "Polyaromatics", P. T. McGrail, Polymer International 41(1996) 103–121 as hereinbefore referred, the contents of which are incorporated herein by reference.

In one preferred embodiment, the polymers are prepared from monomers obtained and isolated with the use of first and second fluids in the substantial absence of an effective amount of azeotrope, according to copending UK patent application number 9803714.6, the contents of which are incorporated herein by reference.

It is of particular advantage that the process according to this embodiment enables the preparation of polymers with convenient isolation thereof from by-products of the reaction, by precipitation from the reaction mixture. This has the advantage that the polymer may be prepared in a relatively low number average molecular weight in a first range as hereinbefore defined, without incurring problems in purification thereof, or loss of yield on isolation.

In a particular advantage of the present invention, the monomers can be prepared according to the abovementioned process in a preselected Mn and with desired end groups. As the monomers are in solution it is possible to introduce alternative end groups by reaction in the solution prior to isolation thereof to form polymer chains of a composition according to the present invention.

In fact the use of the abovementioned preferred process in obtaining polymer compositions having a number average molecular weight in a first range for impregnation, molding or shaping which is substantially less than that which has been commonly employed in the art previously, enables the preparation in excellent manner of impregnated, molded or shaped articles of excellent quality.

The first fluid suitably comprises at least one dipolar aprotic solvent, optionally present in a fluid mixture with other liquids or non liquids, which acts to promote the polymerisation reaction, preferably selected from one or more of sulphur oxides, such as sulphoxides and sulphones, formamides, pyrrolidones, cyclic ketones and the like.

Preferably the second fluid is any fluid displaying the required solvent properties, for example is selected from alcohols and demineralised water or demineralised aqueous solvents and mixtures thereof.

The relative amounts of monomer precursors may be selected according to the desired polymer composition. A composition comprising polyethersulphones to polyetherethersulphones in a desired ratio may therefore be obtained by employing respective proportions of bisphenol and dihalides to monophenol in the same molar amounts. Preferably the proportion of bisphenol and dihalide to monophenol is in the range of 10:90–100:0, preferably 30:70–70:30, providing the polyarylsulphone having PES:PEES of the same proportions.

Preferably reactive end groups are introduced at the outset with the polymer precursors. This has the advantage of avoiding the need to open up the reactor at a later quenching stage, which risks disturbing the reaction and introducing gaseous contaminants such as oxygen and the like. Moreover without being limited to this theory it is thought that the presence of reactive end groups throughout the process may lead to controlled and stable polymer chain growth which is as a result of self regulation of chain length. Such self regulation may take the form of continuous growth of chains with simultaneous chain scission.

Alternatively reactive end groups may be added in a further amount of first fluid to the reacted polymer precursors at a further elevated temperature for a further period. This has the advantage of quenching the reaction mixture to halt the further development of molecular weight.

Reactive end groups may be the same as or different to a polymer precursor as hereinbefore defined. End groups comprising halo or hydroxy reactive groups may be obtained by addition of an excess of a component as hereinbefore defined providing the repeating units of the polyarylsulphone, for example employing a slight molar excess of the dihalide or the bisphenol and monophenol. This has the advantage of convenience and accuracy of handling the minimum number of components. Alternatively end groups comprising amino reactive groups may be obtained by addition of a pre-determined amount of a monomer, which does not provide repeating units of the polyarylsulphone, for example of aminophenol. This has the advantage of dedicated control of end group stoichiometry and molecular weight development. The composition may be isolated in the form of a solid phase precipitate which may be purified and dried as hereinbefore defined and according to known techniques. The precipitate may be further processed to a useable physical form, for example extruded into pellets, drawn or spun as fibres or films and the like, in particular as disclosed in copending GB 0020630 the contents of which are incorporated herein by reference.

The polymer chains obtained may be further converted to derivatives or analogues of the polyaromatic by reaction with a suitable functionalising or derivatising agent. For example the end groups may be modified by providing the polymer chains in the reaction solution, or post-isolation, in a solution of a suitable solvent together with any functionalising or derivatising agent according to known techniques.

In a further aspect of the invention there is provided a process for providing a composition as hereinbefore defined as a shaped article or film, such as impregnated, moulded, injection moulded, extruded or the like articles or cast, spayed or rollered films, comprising obtaining the composition according to the invention as hereinbefore defined, subjecting to a first temperature as hereinbefore defined corresponding to the flow temperature of the unreacted composition and shaping according to known techniques, optionally in solution of a suitable solvent, subjecting to a second elevated temperature as hereinbefore defined corresponding to the temperature for chain linking reaction of the composition and obtaining a shaped article or film having increased number average molecular weight in a second range as hereinbefore defined.

In the case that the composition is provided as fibre or film, a pre-form shape may be provided at ambient temperature, for example by weaving, or comingling fibres and the like, predisposed to flow into a desired shape by melting or dissolving at flow temperature.

Preferably processing conditions comprise elevated temperature in the range of 150–400° C. more preferably 175–300° C., for example 190–250° C. Processing conditions may comprise atmospheric or elevated temperature adapted to the reaction temperature as hereinbefore defined by gradual or ramp increase from the flow temperature. It is a particular advantage that processing may be conducted at atmospheric pressure.

In a further aspect there is provided according to the invention a resin formulation comprising polyaromatic polymer chains and a chain linking component as hereinbefore defined.

A resin composition is particularly suitable for fabrication of structures, including load-bearing or impact resisting structures. For this purpose it may contain a reinforcing agent such as fibres. Fibres can be added short or chopped typically of mean fibre length not more than 2 cm, for example about 6 mm. Alternatively, and preferably, the fibres are continuous and may, for example, be unidirectionally-disposed fibres or a woven fabric, ie the composite material comprises a prepreg. Combinations of both short and/or chopped fibres and continuous fibres may be utilised. The fibres may be sized or unsized. Fibres can be added typically at a concentration of 5 to 35, preferably at least 20%, by weight. For structural applications, it is preferred to use continuous fibre for example glass or carbon, especially at 30 to 70, more especially 50 to 70% by volume.

The fibre can be organic, especially of stiff polymers such as poly paraphenylene terephthalamide, or inorganic. Among inorganic fibres glass fibres such as "E" or "S" can be used, or alumina, zirconia, silicon carbide, other compound ceramics or metals. A very suitable reinforcing fibre is carbon, especially as graphite. Graphite fibres which have been found to be especially useful in the invention are those supplied by Amoco under the trade designations T650-35, T650-42 and T300; those supplied by Toray under the trade designation T800-HB; and those supplied by Hercules under the trade designations AS4, AU4, IM 8 and IM 7.

Organic or carbon fibre is preferably unsized or is sized with a material that is compatible with the composition according to the invention, in the sense of being soluble in the liquid precursor composition without adverse reaction or of bonding both to the fibre and to the thermoset/thermoplastic composition according to the invention. In particular carbon or graphite fibres that are unsized or are sized with epoxy resin precursor or thermoplast such as polyarylsulphone are preferred. Inorganic fibre preferably is sized with a material that bonds both to the fibre and to the polymer composition; examples are the organo-silane coupling agents applied to glass fibre.

The composition may contain for example conventional toughening agents such as liquid rubbers having reactive groups, aggregates such as glass beads, rubber particles and rubber-coated glass beads, filler such as polytetrafluorethylene, silica, graphite, boron nitride, mica, talc and vermiculite, pigments, nucleating agents, and stabilisers such as phosphates. The total of such materials and any fibrous reinforcing agent in the composition should be at least 20% by volume, as a percentage of the total volume of the polysulphone/thermoset mixture. The percentages of fibres and such other materials are calculated on the total composition after reaction or processing at the hereinbelow defined temperatures.

Preferably the composition is obtained as hereinbefore defined, by mixing the polyaromatic, chain linking component, thermoset precursor and (at some stage) any fibrous reinforcing agent and other materials. A solvent may be present. The solvent and the proportion thereof are chosen so that the mixture of polymer and resin precursor form at least a stable emulsion, preferably a stable apparently single-phase solution. The ratio of solvent to polyaromatic is suitably in the range 5:1 to 20:1 by weight. Preferably a mixture of solvents is used, for example of a halogenated hydrocarbon and an alcohol, in a ratio suitably in the range 99:1 to 85:15. Conveniently the solvents in such a mixture should boil at under 100° C. at 1 atm pressure and should be mutually miscible in the proportions used.

Preferably however a solvent is not present and the polyaromatic, chain linking component and thermoset or precursor are brought together at Mn in a first range avoiding the need for hot melting and/or high shear mixing.

The mixture is stirred until sufficiently homogeneous. Thereafter any solvent is removed by evaporation to give a resin composition. Evaporation is suitably at 50–200° C. and, at least in its final stages, can be at subatmospheric pressure, for example in the range 13.33 Pa to 1333 Pa (0.1 to 10 mm Hg). The resin composition preferably contains up to 5% w/w of volatile solvent, to assist flow when used to impregnate fibres. This residual solvent will be removed in contact with the hot rollers of the impregnating machine.

Suitably the composition in form of a resin solution is transferred onto a suitable mould or tool for preparation of a panel, prepreg or the like, the mould or tool having been preheated to a desired degassing temperature.

The stable emulsion is combined with any reinforcing, toughening, filling, nucleating materials or agents or the like, and the temperature is raised to initiate flow and processing thereof. Suitably processing is carried out at elevated temperature up to 150° C., preferably in the range of 100° C. to 130° C., more preferably at about 120° C.–125° C., and with use of elevated pressure to restrain deforming effects of escaping gases, or to restrain void formation, suitably at pressure of up to 10 bar, preferably in the range of 3 to 7 bar abs. Suitably the processing temperature is attained by heating at up to 5° C./min, for example 2° C. to 3° C./min and is maintained for the required period of up to 9 hours, preferably up to 6 hours, for example 3 to 4 hours. Pressure is released throughout and temperature reduced by cooling at up to 5° C./min, for example up to 3° C./min.

It is an advantage that second stage processing is not required to raise the glass transition temperature of the product or otherwise. This is in view of the fact that the Tg is a function of the original polymer architecture. Tg may be increased by incorporation of functional linking components.

The resin composition, possibly containing some volatile solvent already present or newly added, can be used for example as an adhesive or for coating surfaces or for making solid structures by casting possibly in a foamed state. Short fibre reinforcement may be incorporated with composition prior to curing thereof. Preferably a fibre-reinforced composition is made by passing essentially continuous fibre into contact with such resin composition. The resulting impregnated fibrous reinforcing agent may be used alone or together with other materials, for example a further quantity of the same or a different polymer or resin precursor or mixture, to form a shaped article. This technique is described in more detail in EP-A-56703, 102158 and 102159.

A further procedure comprises forming composition into film by for example compression moulding, extrusion, melt-casting or belt-casting, laminating such films to fibrous reinforcing agent in the form of for example a non-woven mat of relatively short fibres, a woven cloth or essentially continuous fibre in conditions of temperature and pressure sufficient to cause the mixture to flow and impregnate the fibres and subsequently processing the resulting laminate.

The resulting multi-ply laminate may be anisotropic in which the fibres are continuous and unidirectional, orientated essentially parallel to one another, or quasi-isotropic in each ply of which the fibres are orientated at an angle, conveniently 45° as in most quasi-isotropic laminates but possibly for example 30° or 60° or 90° or intermediately, to those in the plies above and below. Orientations intermediate between anisotropic and quasi-isotropic, and combination laminates, may be used. Suitable laminates contain at least 4 preferably at least 8, plies. The number of plies is dependent on the application for the laminate, for example the strength required, and laminates containing 32 or even more, for example several hundred, plies may be desirable. There may be aggregates, as mentioned above in interlaminar regions. Woven fabrics are an example of quasi-isotropic or intermediate between anisotropic and quasi-isotropic.

In a further aspect of the invention there is provided the use of a composite mould or tool, bagging material, and the like conventionally used for thermoset materials, to contain or support a composition according to the invention as hereinbefore defined during the processing thereof. Preferably these are constructed of any suitable unsaturated polyester or thermoset resin such as bis-maleimides, nylon film and the like having a heat resistance in excess of the processing temperature to be employed.

In a further aspect of the invention there is provided a prepreg comprising a composition as hereinbefore defined and continuous fibres, obtained by a process as hereinbefore defined.

In a further aspect of the invention there is provided a composite comprising pre-pregs as hereinbefore defined laminated together by heat and pressure, for example by autoclave, compression moulding, or by heated rollers, at a temperature above the curing temperature of the polymer composition.

In a further aspect of the invention there is provided a thermoplast or a thermoplast-modified thermoset resin shaped product comprising a composition, pre-preg or laminar composite as hereinbefore defined, which is obtained by the method as hereinbefore defined. Preferably such product is for use in transport such as aerospace, aeronautical, marine or automotive industries, rail and coach industries or in building/construction industry, or for use in non-high performance transport applications, non-construction applications and adhesive applications, including high temperature adhesive applications.

The invention is now illustrated in non limiting manner with reference to the following examples.

EXAMPLE 1

Synthesis of 40:60 PES:PEES Copolymer, Hydroxy Terminated and Calculated to Have a Molecular Weight of 7,000

Bisphenol-S (18.92 gms), Dichlorodiphenylsulphone (52.84 gms) and Hydroquinone (12.49 gms) were charged to a 3 necked round bottomed flask. Sulpholane (194 mls) was added to the reactants. The reaction flask was then flushed with nitrogen. The reactants were stirred at RT whilst Potassium Carbonate (27.60 gms) was added. After about 5 minutes heat was applied to the reactor using an oil bath set at 180° C. As the temperature rose the reaction converting Hydroquinone and Bisphenol-S to bisphenates proceeded, water and carbon dioxide were produced. The reaction was held at 180° C. for 30 minutes, and water was vented from the reactor. The temperature was raised again to 205° C. and held for a further 60 minutes. Again during this period a large amount of water was produced. The temperature was raised again to 225° C. and the reaction was completed with a hold time of 4 hours.

Upon completion of the reaction the polymer solution was cooled to less than 60° C. and the polymer was precipitated into stirring Methanol. The Sulpholane is extremely soluble in Methanol, it is also extremely soluble in water. The polymer was then filtered from the methanol and was then macerated, filtered again and washed several times with water and dilute Acetic Acid until the pH of the effluent was neutral. The polymer was then dried at 100° C. overnight.

Figure 3:
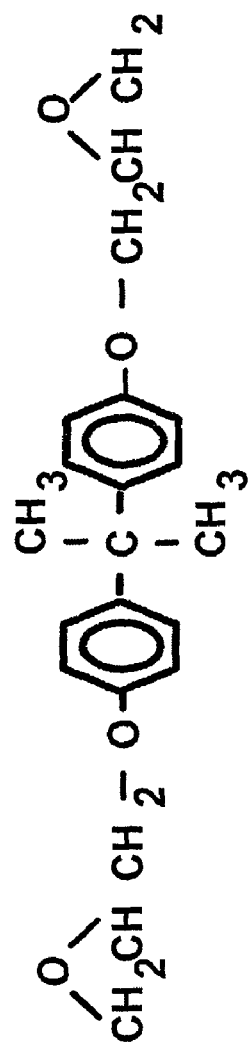
FIG. 3 depicts the chemical structure of a 40:60 PES:PEES copolymer as synthesized in Example 1.
Figure 3:
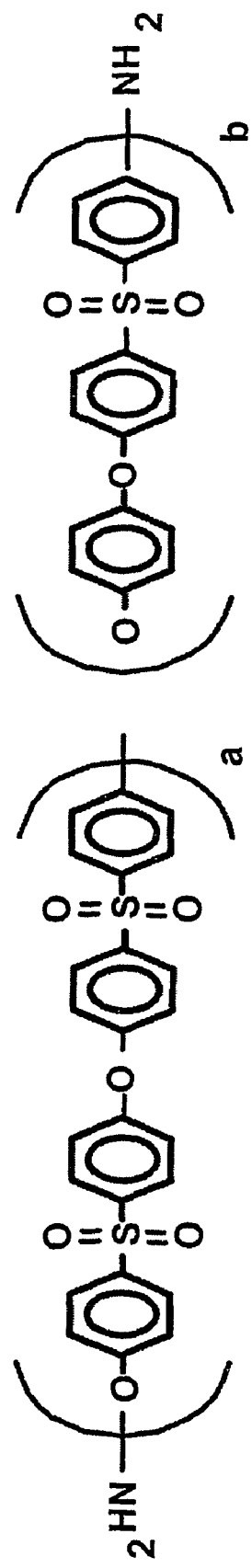

As the bisphenate forms it reacts with the DCDPS by displacing the chlorine group producing an ether link and Potassium Chloride, as a byproduct. Bisphenate formation and the displacement of the chlorine groups continues until all of the monomers have been consumed and no more of the bisphenate remains. The resulting polymer is hydroxy terminated and is shown in FIG. 3 (I). Characterisation of this polymer can be seen in Table 4.

TABLE 4

Synthesis of Hydroxyl Terminated 40:60 PES:PEES Copolymers Using Sulpholane as the Polymerisation Solvent

| Calculated Molecular Weight | Reduced Viscosity (1% in DMF) | End Groups* (NMR) | Mn (NMR) | Mn as determined by GPC | Mw as determined by GPC |
|---|---|---|---|---|---|
| 7,000 | 0.3 | 3.7 OH | 14,824 | 11,600 | 27,900 |

EXAMPLE 2

Synthesis of 40:60 PES:PEES Copolymer, Amine Terminated, Calculated Molecular Weight 7000

Polymer was synthesised using the procedure described in Example 1 and including m-aminophenol (1.75 gms) as monomer, utilising Sulpholane as the polymerisation solvent, and using calculated amount of monomers, such that the polymer was amine terminated. It was not possible to get mechanical data for this due to the brittle nature of the polymer. The structure is shown in FIG. 1 (I).

EXAMPLE 3

Procedure for the Moulding of Chain Extended Thermoplastic Neat Resin Panels

Amine Terminated 40:60 PES:PEES Copolymer Chain Extended with Benzophenone Tetracarboxylic Dianhydride (BTDA).

The low Mn amine ended polymer of Example 2 (100 g) is predissolved in NMP (250 ml) at RT. Upon dissolution the relative amount of BTDA (8.63 g), required to endcap the amine groups (as characterised in Table 4), is added and the blend is warmed to about 50° C. After about 30 minutes further resin of Example 2 (50g—ratio of BTDA terminated resin to amine terminated resin was 2:1) is added to the solution. This forms a blend of anhydride terminated polymer and amine terminated polymer (FIG. I–II and I-), in predetermined ratio, the solution is then precipitate into methanol The precipitated polymer is then washed several times and dried at 100° C.

A 6"×4"×3 mm compression mould is then prewarmed to 300° C. as are the platens of a compression press. The polymer is then taken from the oven at 100° C. and added to the compression mould which is placed into the press and the platens closed. A pressure of 1 ton is applied initially and allowed to reduce. This represents the melting and flowing of the polymer blend. After about 10 minutes pressure is applied again until small amounts of polymer flashing are seen coming from the mould. This pressure is then sustained for about 1 hour, the mould cooled to RT and pressure removed. The neat resin panel is removed. Visual examination of the moulded neat resin part showed it to be transparent and completely intact. Flashings from the side of the panel were subjected to a simple "crease" test which demonstrated its increased toughness over the polymer described in Example 2. This polymer could not be creased to form a "hinge" due to its brittle nature.

Measurements of flexural modulus, yield strength, fracture strength and fracture toughness were made for different molar ratios of polymer to chain linking component. The results are shown in Table 1.

Figure 2:
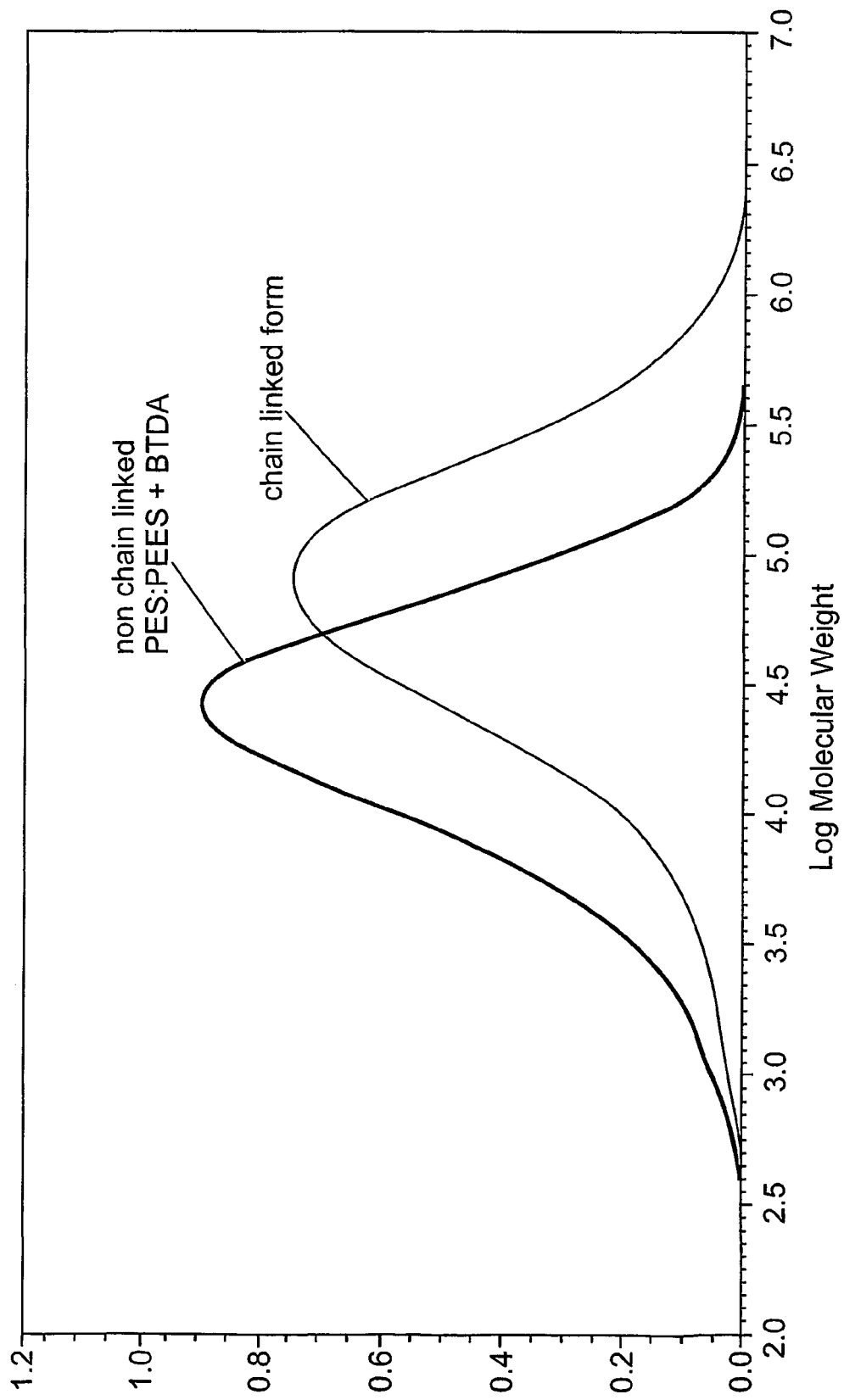
FIG. 2 illustrates the change in molecular weight distribution of an amine terminated 40:60 PES:PEES copolymer of Example 2 when chain extended with benzophonone tetracarboxylic dianhydride as in Example 3 as measured through gel permeation chromatography.

Gel Permeation Chromatography (GPC) was used to determine the Mn (number average molecular weight) and the Mw (weight average molecular weight) of the chain extended polymer and that of the polymer from Example 2. The results are shown in FIG. 2, which demonstrate the considerable change in molecular weight distribution.

Comparative 1

Preparation of Polymer Composition Comprising 40:60 PES:PEES Copolymer, Chlorine Terminated, Calculated Molecular Weight 20,000 Cured Into Neat Resin Casting The high molecular weight chlorine terminated polymer was synthesised using Hydroquinone (g), Bisphenol-S (g) and DCDPS (g) Stoichiometry was such that the polymer was chlorine terminated. The process for the polymerisation was carried out as described in Example 1. Characterisation of the polymer can be seen in Table 4.

Neat resin compression castings were obtained using the procedure as described in Example 3. Visual inspection of the moulded neat resin panel showed it to be similar to that of the chain extended polymer described under Example 3.

The mechanical properties were investigated. The results are shown in Table 1. Characterisation of the polymer can be seen in Table 4.

Comparative 2

Preparation of Commercially Available 3600P Polymer Composition Cured Into Neat Resin Casting Commercially available 3600P was obtained and neat resin casting obtained using the procedure as described in Example 3.

The mechanical properties were investigated. The results are shown in Table 1. Characterisation of the polymer can be seen in Table 4 of the appendices.

TABLE 1

Mechanical properties of neat resins

| Example | Amine ended PES:PEES/ BTDA ended PES:PEES | Glass transition temp (° C.) | Flexural modulus (GPa) | Yield strength (MPa) | Fracture strength (MNm$^{-3/2}$) | Fracture toughness (KJm$^{-2}$) |
|---|---|---|---|---|---|---|
| 3 | 1/2 | 226 | 3.05 | 123.7 | 1.95 | 1.55 |
| 3 | 1/1.5 | 227 | 2.8 | 122.2 | 2.16 | 1.9 |
| 3 | 1/1.25 | 230 | 3.19 | 125.05 | 2.21 | 1.95 |
| C2 | 3600P PES | 225 | 2.8 | 100 | 2 | 2 |
| C1 | Chlorine terminated PES:PEES | 225 | 3 | 120 | 2.15 | 2.2 |

This table demonstrates that the chain linked materials produce identical neat resin mechanical properties to that of their engineering commercial counterparts

EXAMPLE 4

Procedure for the Preparation of Prepreg and the Moulding of Chain Extended Thermoplastic Composite Panels Amine Terminated 40:60 PES:PEES Copolymer Chain Extended with Benzophenone Tetracarboxylic Dianhydride (BTDA).

The low Mn amine ended polymer (500 g) is predissolved in NMP (500 ml), at RT. Upon dissolution the relative amount of BTDA (43.15 g), required to endcap the amine groups, is added and the blend is warmed to about 50° C.

After about 30 minutes further resin of Example 2 (250 g) is added to the solution. This forms a blend of anhydride terminated polymer and amine terminated polymer (FIG. 1-II & I), in predetermined ration.

The polymer solution at an appropriate solids level is then used for the solution impregnation of carbon fibre. In order to aid the wetting of the carbon fibres the temperature of the impregnation bath was kept at 100° C. This is considerably less than the temperature required to impregnate conventional high molecular weight thermoplastics which are typically in the area of 400° C. The fibre/resin/solvent mixture is then passed over a series of heated rollers ranging in temperature from 150 to 220° C. This is required to remove the NMP solvent. The quality of the prepreg was excellent and showed good consolidation of the fibre tows in the thermoplastic matrix. The solvent free prepreg can then be used to prepare composite panels.

A 6"×4"×3 mm open cast mould is filled with a number of layers of prepreg to prepare a defined configuration for a particular mechanical test. The mould is then placed into a vacuum bagging system, typical of the art, and placed into a pressclave or autoclave. Vacuum is applied, to consolidate the prepreg layers and the pressclave is then heated at a predetermined rate to 300° C. as the vacuum is removed. A suitable processing cycle is then followed after which the cooled panel cooled at predetermined cooling rate is removed. Quality assurance testing was carried out to establish the consolidation of the composite in terms of void content by sectioning and micrographic observation. The fibre volume was established using acid etching. The fibre volume was found to be 65% and the void content was acceptable.

Measurements of transflexural strength and short beam shear were made for different molar rations of polymer chain to chain linking component. The results are shown in Table 2 and FIG. 1.

Comparative 3

Preparation of Prepreg of Commercially Available 5200P

Commercially available 5200P (a polyethersulphone manufactured by Victrex), characterisation of this polymer can be seen in Table 4 of the appendices, was impregnated onto carbon fibres (AS4) using the solution impregnation route described in Comparative 2, except in this case the NMP impregnation solution had to be kept at 175° C., in order to render the solution viscosity low enough for impregnation purposes.

The quality of the resulting prepreg was inferior to that of the material from Comparative 2 in that consolidation of the fibre tows within the thermoplastic matrix was low resulting in fibre tows breaking away from the unidirectional prepreg.

This polymer was also melt impregnated at 400° C. from a solid solvent, diphenylsulphone (DPS), typical of the art as described in US patent no. 5374694 (EP 0 412 827 B)

Both prepregs were then used to prepare composite laminates for the determination of Short Beam Shear (SBS) and Transflexural Strength (TFS) the results of which can be seen in Table 2.

Comparative 4

Preparation of Prepreg of Commercially Available 3600P

Commercially available 3600P (a polyethersulphone manufactured by Victrex), characterisation of this polymer can be seen in Table 4 of the appendices, was impregnated onto carbon fibres (AS4) using the solution impregnation route described in Comparative 2, except in this case the NMP impregnation solution had to be kept at 175° C., in order to render the solution viscosity low enough for impregnation purposes.

The quality of the resulting prepreg was inferior to that of the material from Comparative 2 in that consolidation of the fibre tows within the thermoplastic matrix was low resulting in fibre tows breaking away from the uni-directional prepreg.

This polymer was also melt impregnated at 400° C. from a solid solvent, diphenylsulphone (DPS), typical of the art as described in patent no. Both prepregs were then used to prepare composite laminates for the determination of Short Beam Shear (SBS) and Transflexural Strength (TFS) the results of which can be seen in Table 2.

TABLE 2

Mechanical properties (transflexural strength (TFS) and short beam shear (SBS)) of prepregs

| Example | Material (molar ratio) | TFS (MPa) | SBS (MPa) |
|---|---|---|---|
| 4 | PES:PEES | 24.6 | 70 |
| 4 | Amine ended PES:PEES: anhydride ended PES:PEES (1:2) | 54.9 | 78 |
| 4 | Amine ended PES:PEES: anhydride ended PES:PEES (1:1.5) | 98.2 | 83 |
| 4 | Amine ended PES:PEES: anhydride ended PES:PEES (1:1.25) | 127.2 | 85 |
| C3 | 5200P (solution) | 55 | 75 |
| C3 | 5200 (melt) | 95 | 69 |
| C4 | 3600P (solution) | 48 | 72 |
| C4 | 3600 (melt) | 94 | 87 |

EXAMPLE 5

4,4'-fluorobenzophenone (27.51 g), 4,4'hydroxy benzophenone (21.41 g), m-aminophenol (6.68g) and potassium carbonate (18.32g) were reacted in diphenyl sulphone (147g) to give a 1.5K amine terminated PEK polymer the characterisation results of which can be seen in Table 4. The reaction took several stages to complete from the preparation of the potassium salts of m-aminophenol and 4'-hydroxybenzophenone to the final polymerisation stage.

Figure 4:
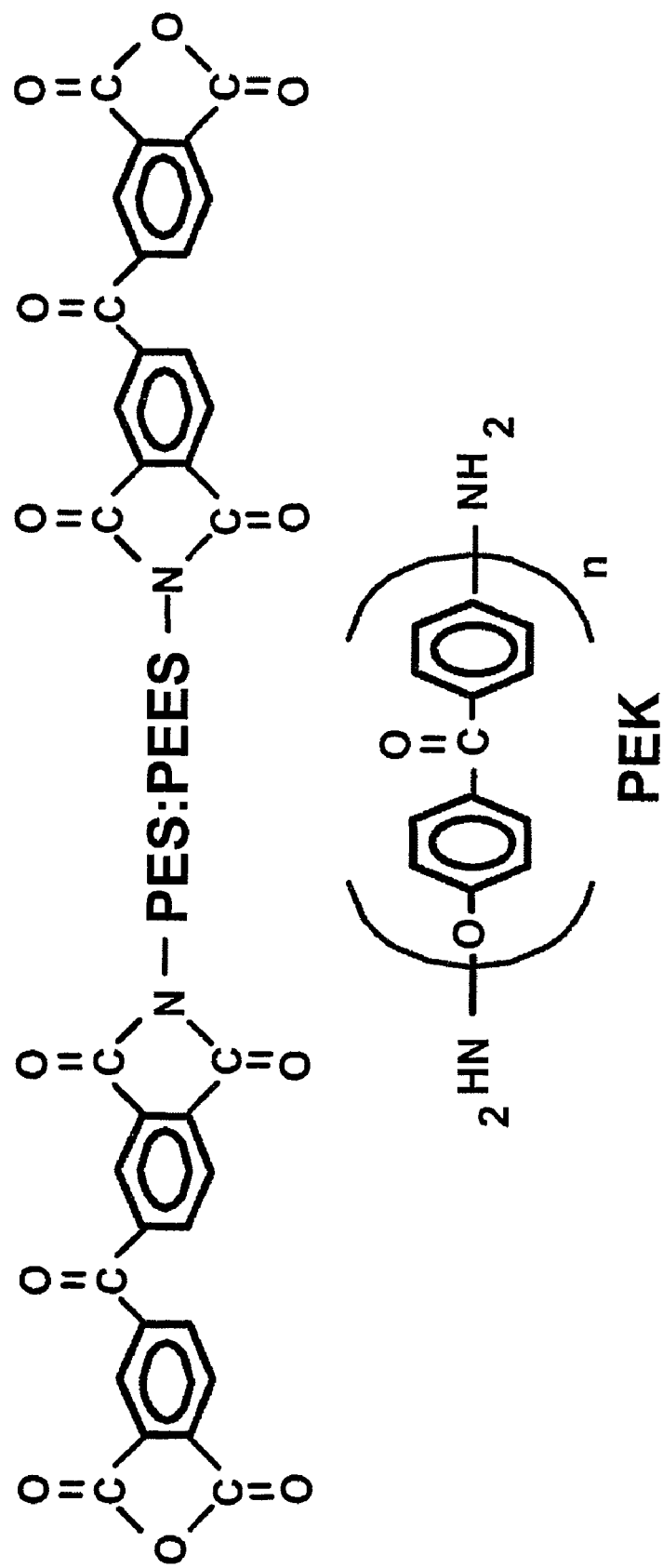
FIG. 4 illustrates the multiblock product formed by blending anhydride ended APA with amine ended PEK comprised repeating units as prepared in Example 6.

The polymer was isolated into acetone and characterised using $^1$Hnmr and DSC, confirming that the polymer backbone was PEK and that the end groups were >95% amine. DSC analysis showed a single melting point sequence, a Tp at 353° C. The product structure is shown in FIG. 4 (II).

The level of crystallinity was measured using X-ray diffraction (XRD) and Differential Scanning Calorimetry (DSC) and was found to be in the range of 50–60%.

EXAMPLE 6

Preparation of APA/PEK Multiblocks

The anhydride ended APA of Example 3A., shown in FIG. 4(I) was blended with the amine ended PEK of Example 5 (Mn 1500) in NMP—the amine terminated PEK was extremely soluble in the APA/NMP mixture and this was unexpected—and on dissolution the blended polymer was precipitated into methanol and the purified blend recovered.

The multiblock was prepared by heating the blend up to 310° C. in a compression press for 60 minutes prior to the application of pressure to press a thin film. The film was cooled to rt using air and water blown through the platens of the press.

The film was very opaque, indicating its crystalline nature, and characterisation was by DSC. APA Mn was 10,000 and PEK Mn 1500. The DSC showed a Tg of the multiblock occurring at 216° C., Tp at 369° C. with a level of crystallinity of 12%. The product comprised repeating units as shown in FIG. 4 in the form of a multiblock.

EXAMPLE 7

Chain Linking of Crystalline Diamine Ended PEK Polymer Composition and Neat Resin Casting An impregnation solution was prepared by synthesising the anhydride ended APA (63g), using the polymer characterised from Example 3 and found in Table 4, in NMP at 50° C. using a stoichiometric amount of BTDA as described in Example 3. The previously synthesised amine ended PEK (7g), characterisation of this polymer can be found in Table 4, was then added and allowed to dissolve. On dissolution the solution containing 40% solids was used to impregnate AS4 carbon fibre tows. The same conditions described earlier to impregnate the chain extended system were utilised. Excellent looking prepreg was produced having a fibre content of 64+/−2%. The product comprised repeating units as shown in FIG. 4, having a constant value for a and b small amounts of the polymer flashings were used to characterise the molecular weight of the chain extended polymer, the results of which can be seen in Table 4.

Figure 5:
FIG. 5 is a TEM micrograph depicting the morphology of amorphous crystalline phases of the resin casting of Example 7 at low magnification showing a range of crystalline phases revealing various sizes and shapes.
Figure 6:
FIG. 6 is a TEM micrograph depicting the morphology of the amorphous crystalline phases of the resin casting of Example 7 at increased magnification revealing a well defined lamella structure.

TEM micrographs (FIGS. 5 and 6) show the morphology of the amorphous crystalline phases of the resin casting of Example 7. FIG. 5 at low magnification (13.8K) shows a range of crystalline phases revealing various sizes and shapes. The lack of contrast around the interface between amorphous and crystalline suggest a good interface between the two phases. Further increased magnification in FIG. 6 reveals a very well defined lamella structure.

EXAMPLE 8

Preparation of Sample of Amorphous Amine Ended KM Polymer Prepreg of Example 4 of the Invention—For the Assessment of the Interlaminar Shear Strength (ILSS) Properties ILSS sample was prepared from the prepreg of Example 4, using the following procedure.

Prepreg was moulded in an autoclave into panels with appropriate lay-up using a standard vacuum bag technique and the following cure cycle:

heat to 125° C. at 2° C./min under pressure between 3 and 7 bar abs;

hold 6 h while venting vacuum bag;

cool to rt at less than 3° C./min.

EXAMPLE 9

Preparation of Sample of Semicrystalline Amine Ended KM PEK Polymer Prepreg of Example 6 of the Invention—For the Assessment of the Interlaminar Shear Strength (ILSS) Properties ILSS sample was prepared from the prepreg of Example 7, using the procedure of Example 8.

Comparative 5

Preparation of Sample of HTA/IM6, Chlorine Ended—For the Assessment of the Interlaminar Shear Strength (ILSS) Properties Interlaminar sample was prepared from a commercially available chlorine ended Victrex polymer prepreg, using the procedure of Example 8.

Comparative 6

Preparation of Sample of Low Mn HTA/MLW/IM6 Chlorine Ended—For the Assessment of the Interlaminar Shear Strength (ILSS) Properties ILSS sample was prepared from a commercially available low Mn chlorine ended Victrex polymer prepreg, using the procedure of Example 8.

EXAMPLE 10

Solvent Resistance as Determined by the % Retention of ILSS Properties of Processed Samples of the Invention ILSS samples of the compositions of the invention obtained in Examples 8 and 9 and Comparative 5 and 6 were exposed to solvents and % retention of ILSS properties were determined.

The results are shown in Table 3

TABLE 3

| | % Solvent Resistance of interlaminar samples | | | | |
|---|---|---|---|---|---|
| Solvent | T/time | C5 | C6 | 8 | 9 |
| MEK | RT/1 hr | 81% | 0% | 66% | 77% |
| JP8 | RT/1000 hr | 96% | 60% | 99% | 85% |
| JP8 | 70° C./1000 hr | 76% | 54% | 82% | 65% |
| Skydrol | RT/1000 hr | 36% | 30% | 36% | 77% |
| Skydrol | 70° C./1000 hr | 28% | 18% | 22% | 44% |

From the results the sample of Examples 8 and 9 comprising amorphous and semi-crystalline block copolymer showed excellent properties in the Skydrol exposure test at room temperature for 1000 hours.

EXAMPLE 11

Tan Delta Measurements for Resins of Similar Mn

Figure 7:
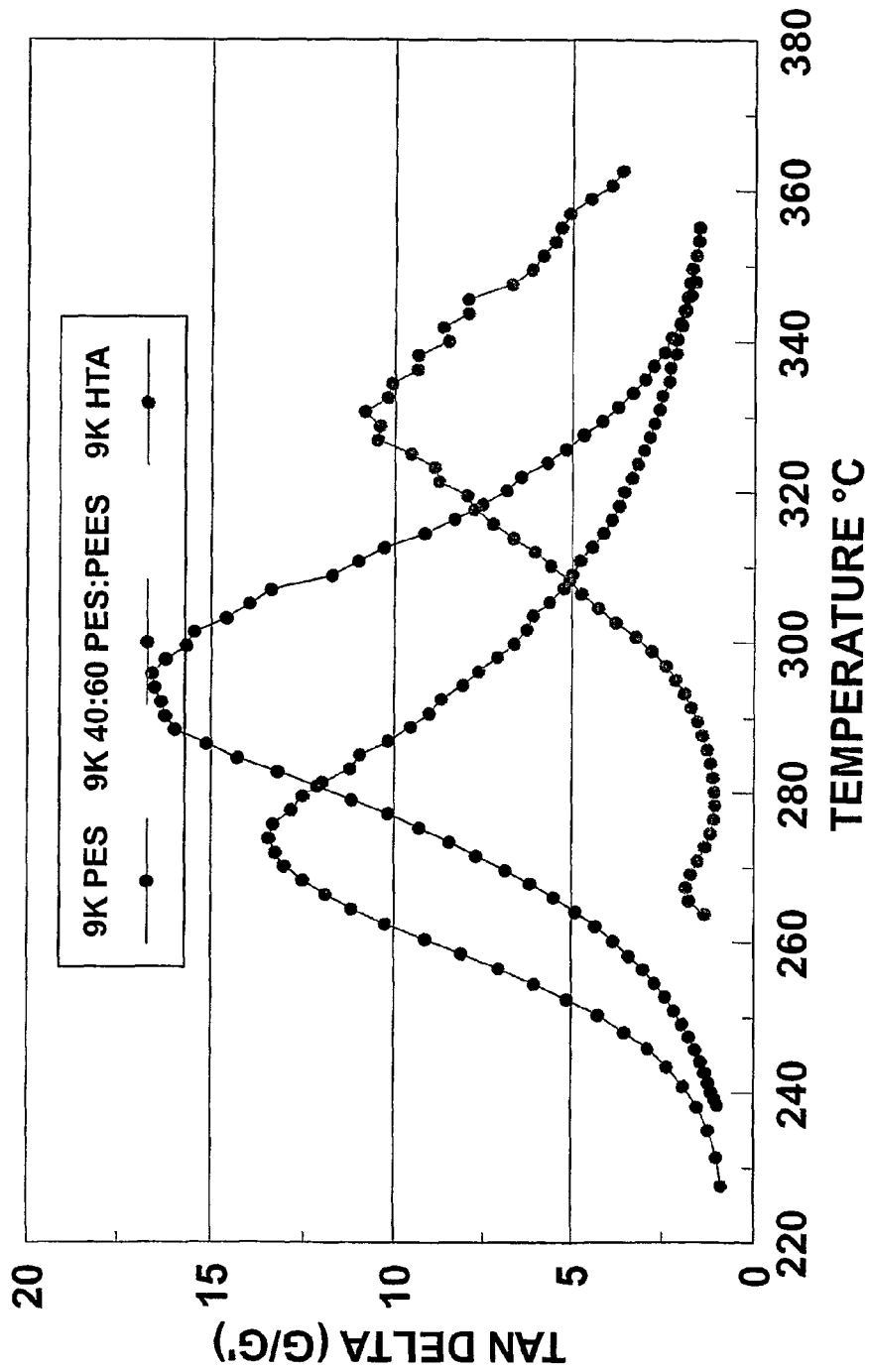
FIG. 7 depicts tan delta measurements for resins of similar molecular weight as described in Example 11.

Rheology of samples of 9KPES, 9K PES:PEES and 9K amorphous HTA were carried out using an RDS800 machine, all the polymers were hydroxyl terminated and the characterisation of these polymers can be seen in Table 4. The polymers were melted between 40 mm diameter plates and the materials elastic and storage moduli, viscosity and tan delta values, as a function of temperature, were determined. The value of tan delta, which measures the separation between the two moduli, is an indication of the flow properties of the polymer. Maximum separation, that is elastic moduli lying below the storage moduli would represent a polymer with high flow properties. The results are shown in FIG. 7.

9000 HTA is very inflexible and has flow temperature of 340° C.

9000PES has flow temperature of 300° C.

9000PES:PEES has flow temperature of 270° C., coincident with the chain linking reaction.

The polymer thus starts to react while flowing and continues to react, to give product having Mn in the second range determined by the mobility of the polymer. A highly mobile polymer will have a short reaction window and result in low Mn (second range) polymer, compared to a less mobile polymer which has a long window of chain linking reaction and results in high Mn (second range) polymer.

EXAMPLE 12

Tan Delta Measurements for Resins of Different Mn

Figure 8:
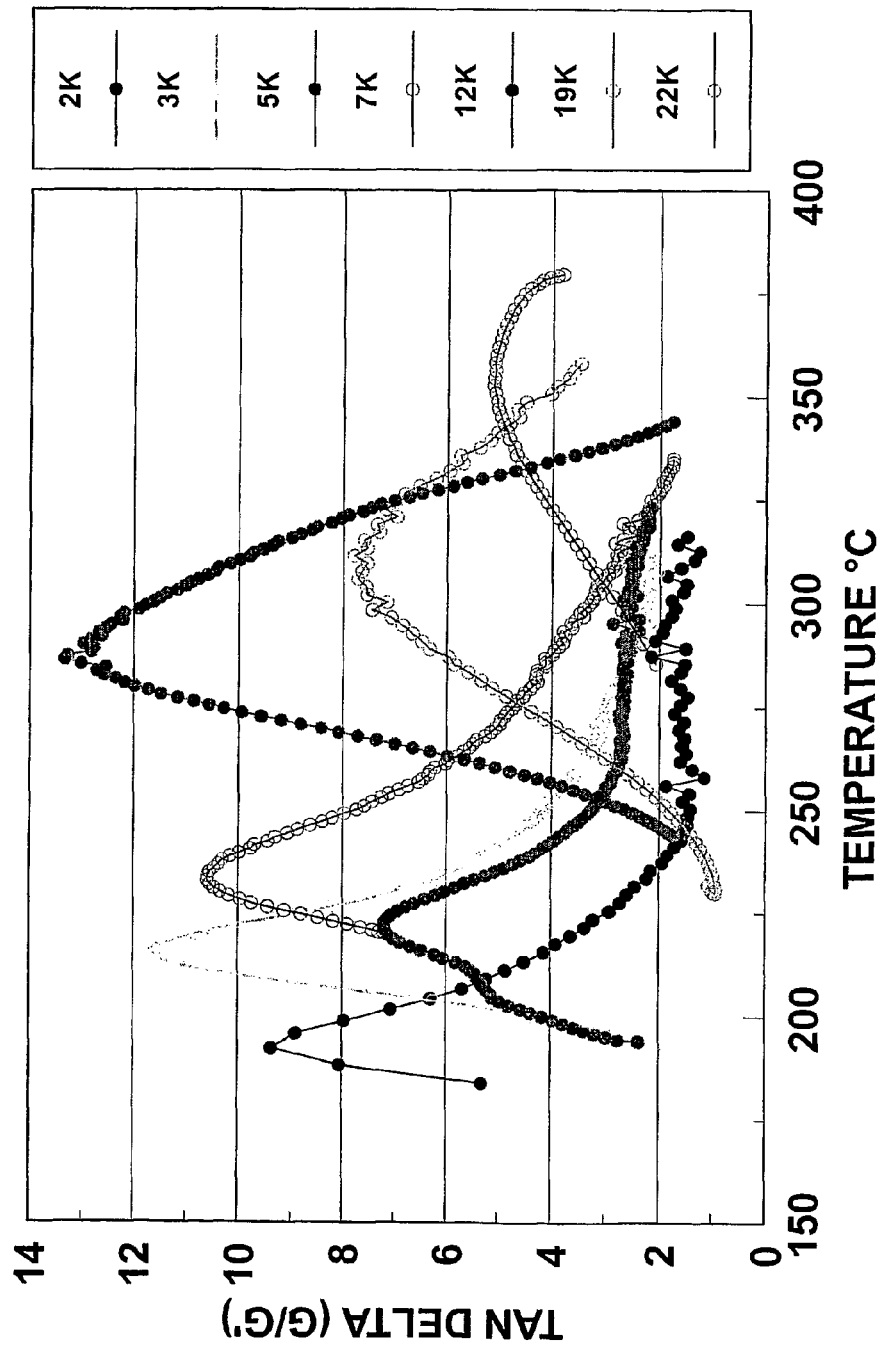
FIG. 8 depicts tan delta measurements for resins of different molecular weight as described in Example 12.
Figure 9:
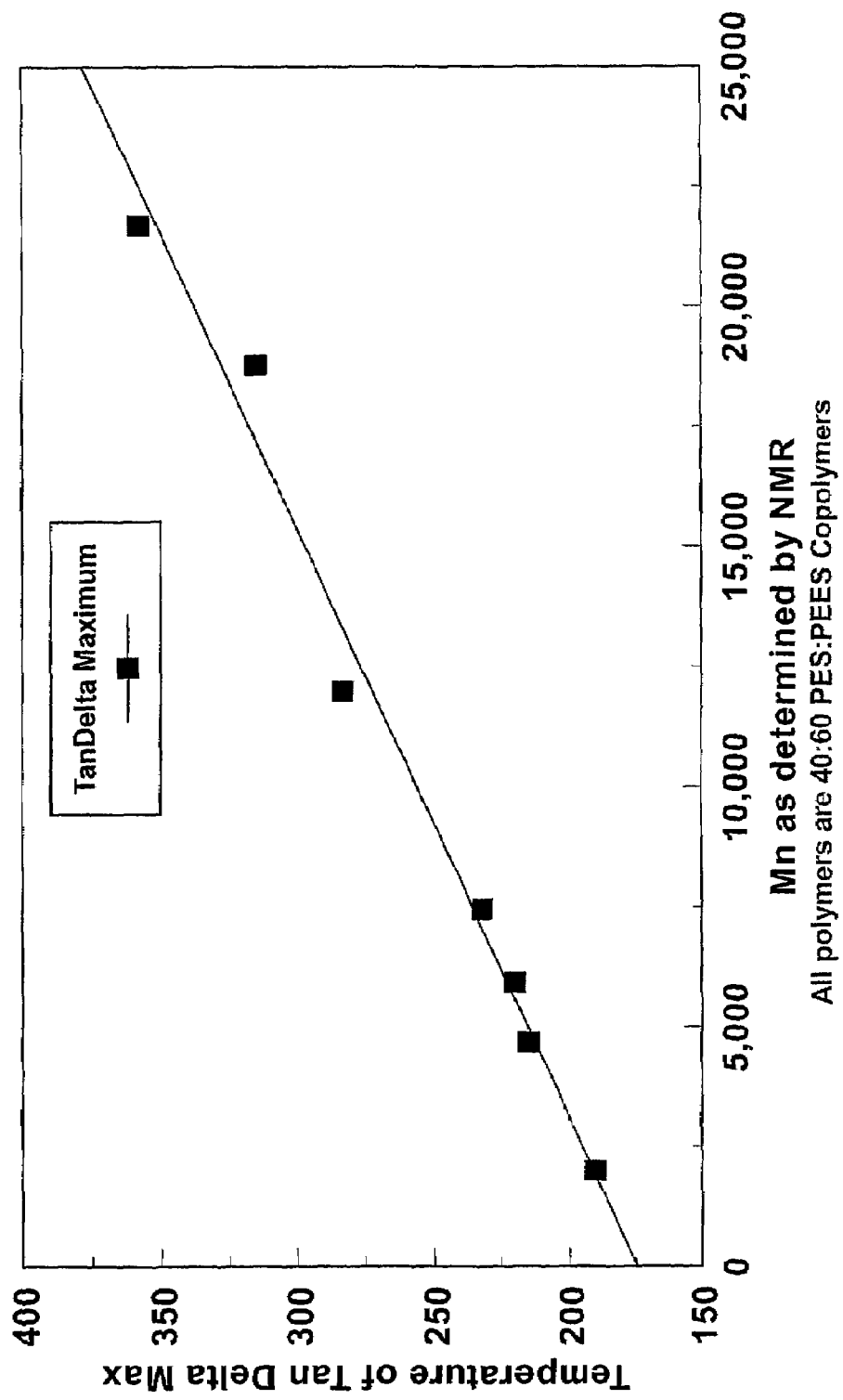
FIG. 9 plots the maximum tan delta against molecular weight as a linear relation as discussed in Example 12.
Figure 10:
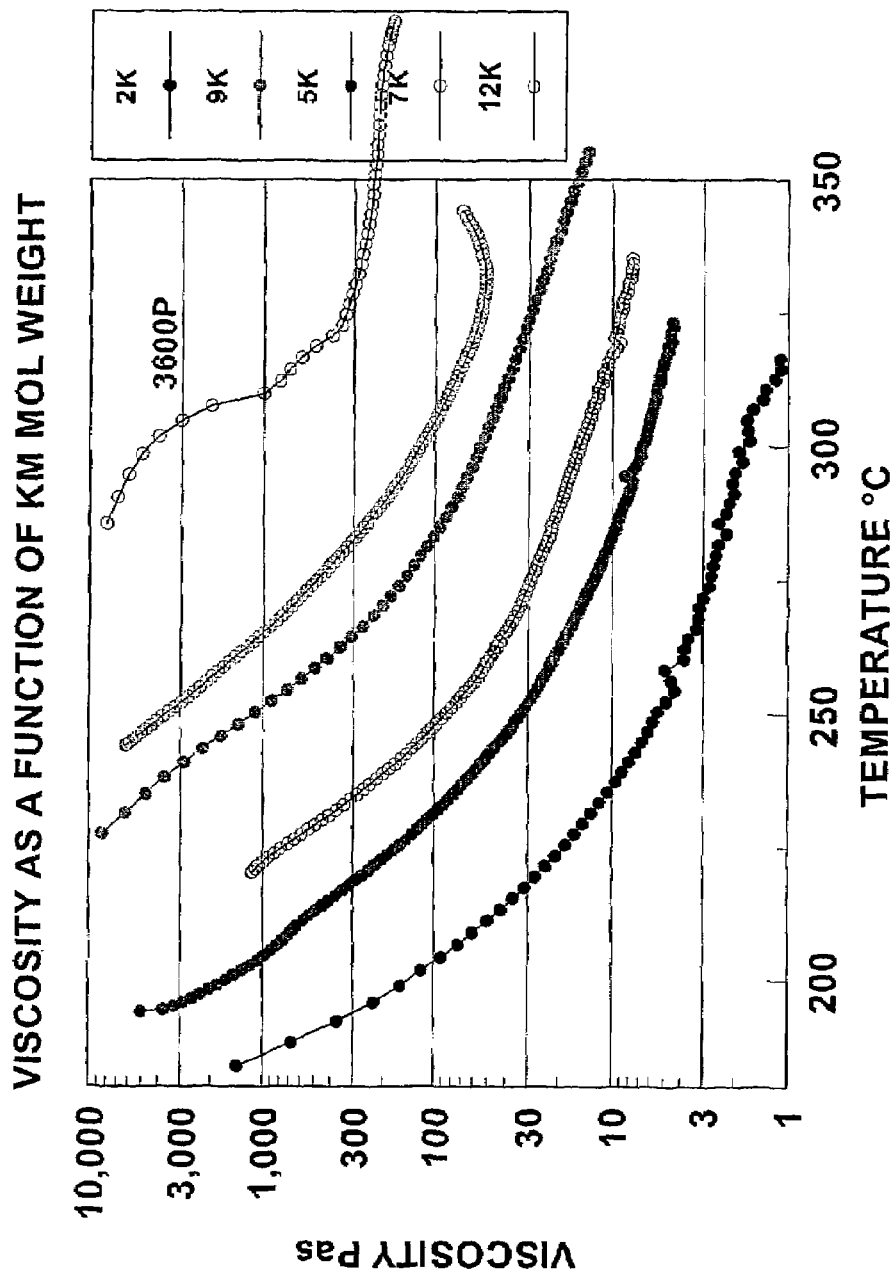
FIG. 10 illustrates viscosity measurements for low molecular weight resins of the present invention compared with a conventional resin as discussed in Example 12.

The measurements of Example 11 were repeated for 40:60 PES:PEES resins, amine ended, having different Mn. The results are shown in FIG. 8. FIG. 9 shows a plot of the maximum tan delta against Mn as a linear relation. Viscosity measurements (FIG. 10) are also shown to be regular for low Mn resins of the invention, compared with the conventional Comparative 2.

EXAMPLE 13

Crystallinity Measurement

Comparison was made of multiblock PES:PEES compositions having different Mn, in terms of their crystallinity.

The results indicated that crystallinity varies with Mn and can be as high as 25%. It was not possible to significantly affect crystallinity by subjecting to elevated temperature.

The TEM shows crystalline phases of ordered stacked chains.

Further advantages of the invention are apparent from the foregoing.

The invention claimed is:

1. A polymer composition comprising chains of first and second aromatic polymers of number average molecular weight in a first range, each having at least one reactive end group and having the same polymer backbone but different end groups, the first aromatic polymer having a lower flow temperature than the second similar aromatic polymer, both being amorphous the second polymer being rendered in flowable form in the presence of the first polymer in fluid form, thereby providing a processing aid, or an amorphous first aromatic polymer and a second crystalline or semi crystalline aromatic polymer having a characteristic melting point, the semi crystalline aromatic polymer being rendered flowable by solvent effect of the first polymer, acting as a cosolvent, diluent, dispersant, carrier or the like for the second aromatic polymer, wherein the at least one chain linking component comprises at least two linking sites, characterized in that a plurality of the first and second aromatic polymer chain end groups are adapted to react with the linking sites at chain linking temperature in excess of the polymer flow temperature to form linked polymer chains of number average molecular weight in a second range which is in excess of the first range, substantially thermoplastic in nature.

2. A polymer composition comprising:
   a. a plurality of a first amorphous aromatic polymer chain with a number average molecular weight in a first range, having a first polymer flow temperature and at least one reactive end group;
   b. a plurality of a second aromatic polymer chain with a number average molecular weight in a first range, having a second polymer flow temperature and at least one reactive end group, and having the same polymer backbone as the first aromatic polymer, but different reactive end groups;
   c. the first polymer flow temperature being less than the second polymer flow temperature;
   d. the second aromatic polymer capable of being rendered in flowable form in the presence of the first aromatic polymer in fluid form, thereby providing a processing aid;
   e. at least one chain linking component having at least two linking sites;
   f. wherein the first and second aromatic polymer chain reactive end groups are adapted to react with the chain linking component linking sites at a chain linking temperature in excess of the first aromatic polymer flow temperature to form linked polymer chains of number average molecular weight in a second range, which is in excess of the first range; and
   g. substantially thermoplastic in nature.

3. The polymer composition of claim 2 wherein the second aromatic polymer is amorphous.

4. The polymer composition of claim 2 wherein the second aromatic polymer is crystalline or semi crystalline having a characteristic melting point, the crystalline or semi crystalline second aromatic polymer being rendered flowable by solvent effect of the first aromatic polymer, acting as a co-solvent, diluent, dispersant, carrier or the like for the second aromatic polymer.

* * * * *